J. P. HAMMETT.
MECHANICAL MOVEMENT.
No. 194,964. Patented Sept. 11, 1877.
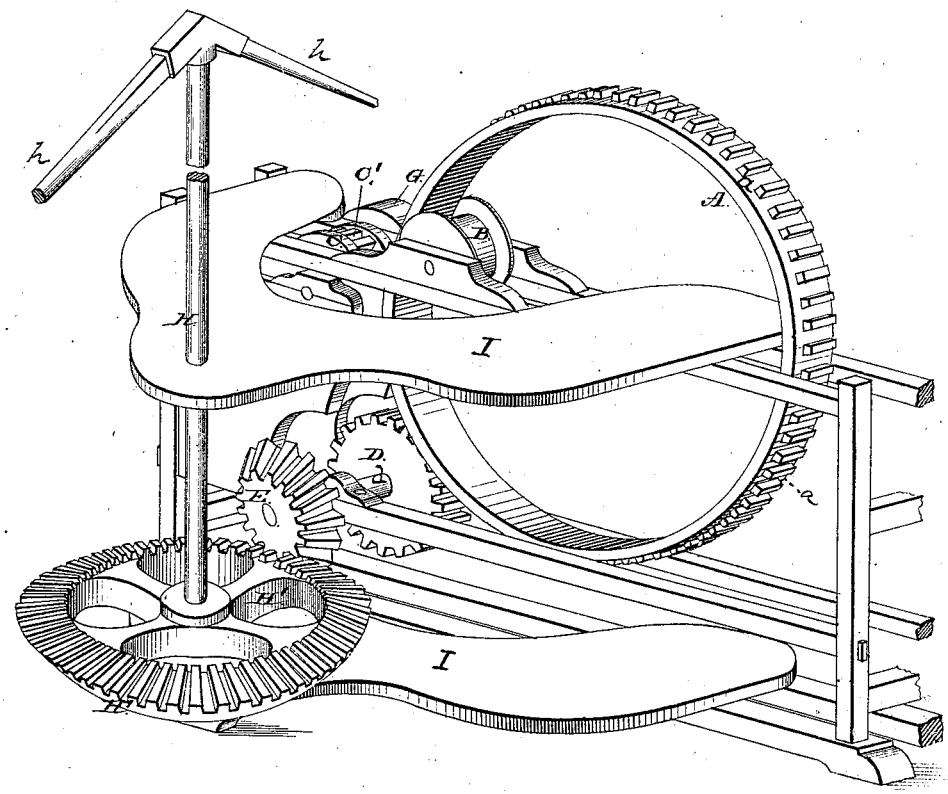
Attest:
Inventor:
James P. Hammett

UNITED STATES PATENT OFFICE.

JAMES P. HAMMETT, OF DRAKE'S CREEK, ARKANSAS, ASSIGNOR OF ONE-THIRD OF HIS RIGHT TO ELIAS HARRELL, OF SAME PLACE.

IMPROVEMENT IN MECHANICAL MOVEMENTS.

Specification forming part of Letters Patent No. 194,964, dated September 11, 1877; application filed April 10, 1874.

*To all whom it may concern:*

Be it known that I, JAMES P. HAMMETT, of Drake's Creek, in the county of Madison and State of Arkansas, have invented certain new and useful Improvements in Mechanical Movements; and I do hereby declare that the following is a full, clear, and exact description thereof, which will enable others skilled in the art to which it appertains to make and use the same, reference being had to the accompanying drawings, and to the letters of reference marked thereon, which form a part of this specification.

In the drawing, which is a perspective view of my improved mechanical movement, A represents an externally-cogged ring. The cogs do not extend across the entire width of the ring, thus leaving a smooth or unobstructed flange or tread, $a$, upon its face at the ends of the cogs. B is a flanged guiding and supporting wheel, mounted in suitable bearings upon the frame-work. The inner face of cogged ring A bears against and runs upon the pulley B, between its flanges. C C' is a toothed pinion, the cogs C' of which are sunken below the periphery of the sides of the pinion, these sides forming flanges or treads C, corresponding substantially with the tread at the ends of the cogs of ring A, and serving not only as anti-friction rollers, but also to determine the depth to which the gears shall mesh. D is a toothed pinion, meshing with the cogged ring A. E is a beveled pinion, keyed to the shaft $d$ of pinion D. H is a vertical shaft, mounted in suitable bearings in brackets I I attached to the main supporting-frame. H' is a bevel-gear wheel, keyed to the lower part of shaft H, and meshing with the bevel-pinion E on shaft $d$. $h$ $h$ are sweeps or levers, attached to the upper end of shaft H. G is a band-wheel, keyed to the shaft of pinion C C'.

Power being applied to the sweeps $h$ $h$, and bevel-gear H' thereby rotated, the cogged ring A is made to revolve through gears E and D, and a rapid rotary motion imparted to the pinion C C' and band-wheel G, as will be readily understood from an examination of the drawings without any further explanation.

I do not claim, broadly, the cogged ring A with the tread $a$ at the ends of the cogs, nor the pinion provided with the corresponding tread; but I believe that these features of construction perform a new and important function when employed in connection with a geared or cogged ring which has no axle or other central support, but is supported at one side only, it being apparent that were it not for these treads the weight of the cogged ring would cause the teeth to mesh so deeply as to seriously interfere with its operation.

It is not necessary to describe in detail the construction of the frame-work of my new movement.

What I claim is—

1. In a mechanical movement, the cogged ring A, in combination with the anti-friction wheel B, pinion C C', and pinion D, substantially as set forth.

2. In a mechanical movement, the cogged ring A, provided with the tread $a$, having no axle, and supported during rotation from one side only, in combination with the pinion provided with the tread C, which supports one side of the cogged ring, substantially as set forth.

3. The combination of the cogged ring A, wheel B, pinion C C', pinion D, bevel-wheels E H', shaft H, and sweeps $h$ $h$, substantially as set forth.

JAMES P. HAMMETT.

Witnesses:
J. M. BERRY,
G. T. BERRY.